United States Patent Office 3,554,833
Patented Jan. 12, 1971

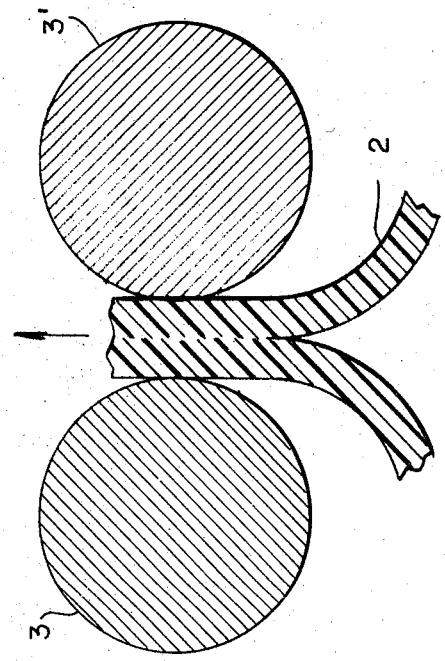
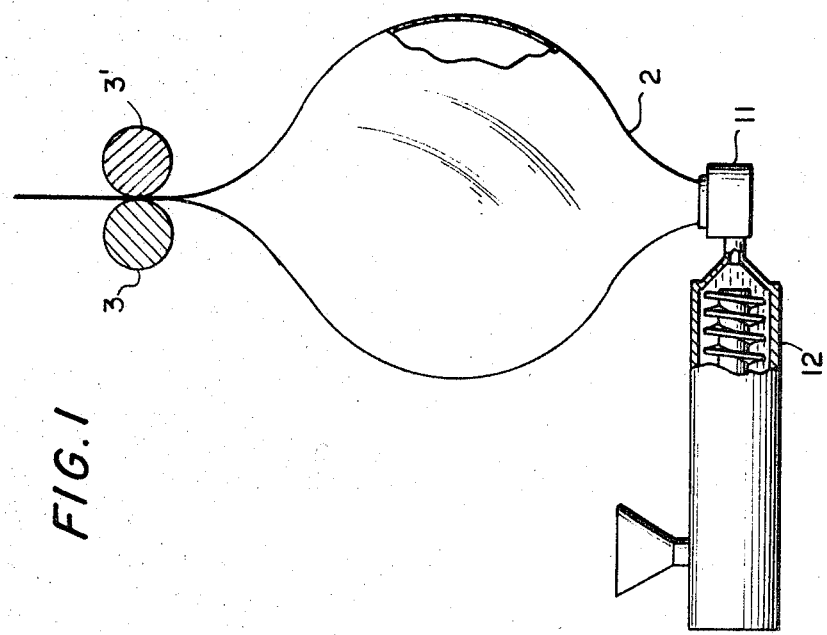
*INVENTORS*
WILLIAM C. DE VRIES
ELDON L. JOHNSON

3,554,833
METHOD FOR THE PRODUCTION OF LAMINAR THERMOPLASTIC FILMS
William C. De Vries, Macedon, and Eldon L. Johnson, Shortseille, N.Y., assignors to Mobil Oil Corporation, a corporation of New York
Filed Jan. 12, 1968, Ser. No. 697,342
Int. Cl. B29c *17/02*
U.S. Cl. 156—229                                2 Claims

ABSTRACT OF THE DISCLOSURE

A method for the production of thermoplastic film laminates which comprises extruding a thermoplastic tube; inflating the extruded tube with a gaseous medium; flattening the inflated tube by passing it through a pair of rotating nip rollers, said collapsing step being effected while the tubular film is still in a heat-softened plastic condition whereby the walls of the tube fuse together thereby forming a flat, two-layer thermoplastic film laminate.

BACKGROUND OF THE INVENTION

(I) Field of the invention

The present invention relates to a method of forming thermoplastic laminar structures and more particularly to a method whereby such laminates are formed as an integral part of the tubular film extrusion step.

(II) Description of the prior art

In the past it has been known to form thermoplastic film laminates by adhesively securing individual layers of thermoplastic film together. U.S. Pat. No. 3,322,588 discloses a method for the preparation of heavy gauge laminated thermoplastic sheets by extrusion of a thermoplastic tube, inflating the tubing to a selected diameter and applying an adhesive material to the inner wall of the tubing, and subsequently flattening the tubing to form an adhesively bonded laminated sheet having a thickness which is double the wall thickness of the inflated extruded tubing. Such a method for the manufacture of a laminar film structure is undesirable from the standpoint of the necessity to employ special adhesive coating to effect the welding together of the individual layers to effect the laminate. The method of the present invention eliminates the need for the employment of such adhesive coating materials.

SUMMARY OF THE INVENTION

In the method of the present invention, molten thermoplastic material is continuously extruded through an annular die orifice thereby forming a tube. The still semi-molten thermoplastic material is drawn from the die by subsequent passage of the tube through a pair of rotating collapsing rollers. The collapsing rollers flatten the tube and seal air in the tube between the die and the collapsing rollers. The amount of air entrapped in the tube at this location determines the diameter of the thermoplastic tube. In the method of the present invention the aforedescribed collapsing of the tube is effected while the inner surfaces of the tube are still in a semi-molten, heat-softened condition whereby passage of the tube through the nip of the collapsing rollers causes the inner surfaces of the tube to fuse and weld together thereby forming a two-layer film laminate upon emergence from the colapsing rollers.

BRIEF DESCRIPTION OF THE DRAWING

FIG. 1 is a diagrammatic illustration of an apparatus which may be employed in the method of the present invention.

FIG. 2 is an enlarged sectional taken through line 2—2 of FIG. 1.

DESCRIPTION OF SPECIFIC EMBODIMENTS

As hereinbefore described, the present invention provides for the production of flat laminar films characterized by improved physical properties from thermoplastic tubing which has been extruded utilizing the standard "trapped-bubble" technique. In addition, whereas in the past such laminates were formed utilizing special adhesive applied interiorly of the tube, the present invention provides a method whereby laminates may be formed in the absence of such adhesive materials.

Accordingly, the present invention provides a method whereby molten thermoplastic material is extruded in the conventional manner from an annular orifice forming a tube which is subsequently drawn off by a pair of rotating collapsing rollers. The interior surface of the tubular film, however, in accordance with the present method, is maintained at a temperature generally above the softening point thereof prior to its point of entry into the collapsing rollers. Such temperature control is effected by carefully controlling extrusion and cooling conditions and by allowing the collapsing rollers to be operated at a temperature substantially equivalent to that of the film temperature as it enters the collapsing rollers. Because of the aforedescribed general temperature conditions as the film tube assumes a lay-flat condition as a result of being pinched in the nip of the collapsing rollers, the interior surfaces of the film which come into contact with one another, as a result of such collapsing action, become fused and welded together whereby the lay-flat film tube as it emerges or exits from the collapsing rollers is converted into a two-layer laminated film structure which cannot be easily delaminated during subsequent handling and processing thereof. Such a laminar film product has been found useful for general packaging applications such as for example film overwrap material, e.g. bread overwrap, or conversion into thermoplastic bags, e.g. side seal bags for example.

Referring now to the accompanying drawing, FIG. 1, a molten thermoplastic polymer is extruded in the form of a seamless tubing 2 from an extrusion die head 11 of conventional extruder 12. Tubing 2 was expanded while still in a semi-molten condition by employing a trapped-bubble of air within the tubing between extrusion die head 11 and collapsing rotating pressure rollers 3 and 3', the function of which will be described subsequently. The rate of withdrawal of tubing 2 from die head 11 may vary and is dependent on factors such as the type of polymer being extruded, the rotational speed of the screw contained within the conventional extruder 12, the gauge of the material being extruded, and the desired physical properties of the finished film product. The rotating pressure rollers 3 and 3' are located close enough to the die outlet orifice so that once tubing 2 is expanded to its final predetermined diameter, it may be collapsed by rotating pressure rollers 3 and 3' while the interior surfaces of tubing 2 are still at an elevated temperature, i.e. at a temperature at least above the softening point of the particular polymer being extruded. In some instances it has been found desirable to employ heaters (not shown), e.g. radiant heaters, positioned between die head 11 and rotating pressure rollers 3 and 3' in order to insure that the interior surfaces of tubing 2 remain in a semi-molten condition immediately prior to the tube entry into the nip of rollers 3 and 3'. In the case of polyethylene, for example, such a temperature is generally in the range of about 140° F. to about 200° F. and preferably about 190° F.

The temperature of the interior surface of tubing 2 is maintained so that it remains above the softening point of the polymer, i.e. such inner surface still being in a semi-molten condition, when the tubing is collapsed and pinched in the nip of rotating pressure rollers 3 and 3'. As a result, the opposed interior surfaces of the collapsed film tube weld and fuse together whereby a two-layer film laminate, the layers of which are securely heat welded together, emerges from the exit end of pressure rollers 3 and 3'. The laminar film is subsequently allowed to cool to approximately ambient temperatures prior to passage to wind-up rollers (not shown). Although not illustrated in FIG. 1, rather than passing the laminated film material to a wind-up roller for storage, it may be processed in-line continuously into bag forming equipment and/or printing equipment for imprinting advertising indicia on the surface thereof.

Illustrative examples of suitable thermoplastics which may be employed in the method of the present invention include polyolefins such as polyethylene, polypropylene and polybutene and copolymers or mixtures and blends thereof; polystyrene, rubber modified polystyrene materials; vinyls such as polyvinyl-chloride, polyvinylidene-chloride; and vinyl acetate as well as copolymers of the latter with mono-olefins such as ethylene-vinyl acetate for example.

It will be understood that the actual working temperature, or temperature at which the extruded thermoplastic tube is maintained prior to passage thereof through pressure rollers 3 and 3' in order to insure thermal fusion thereof will depend upon the nature of the thermoplastic materials being employed.

Pressures utilized to effect a fusion of the interior walls of the thermoplastic tubing will also depend upon the nature of the thermoplastic being laminated. When laminating polyethylene tubing, suitable pressures have been found to be at least about 15 p.s.i. and preferably about 25 p.s.i.

The following example is intended to serve as an illustration of the method of the present invention and accordingly is not intended to be construed in a limitative sense.

EXAMPLE 1

Polyethylene, having a density of about 0.919, and a melt index of about 1.5, was fed into a standard thermoplastic extruder which had an extruder bore size of 4½". The extruder had 5 heated zones, maintained at 275° F. to 300° F. The polyethylene was screw fed along the barrel of the extruder to the extrusion die head and extruded from the die orifice thereof, at a temperature of 275° F., into the form of a continuous tubing having an outside diameter of 19" and a wall gauge of 1.0 ml. The emerging tubing was fed from the extrusion orifice into the nip formed by a pair of rotating pressure rollers. The rate of extrusion was 200 lbs. per hour. The tubing was expanded by introducing air into the interior of the tubing located between the orifice of the extrusion die and the rotating collapsing pressure rollers. This air was maintained within the tubing at this location under pressure.

Enough air was maintained within the tubing to expand the tubing to twice its diameter. As the inflated tubing was collapsed by being pressed into the nip of rotating pressure rollers 3 and 3' (as identified in the accompanying drawings), the interior walls of the tubing were forced together under sufficient pressure to effect a fusion thereof. The laminated tubing was subsequently cooled to a permanent set and subsequently passed to a wind-up roller.

Properties of the laminated flat film are tabulated below in Table 1 and compared to properties of a non-laminated flat film produced in the manner described above with the exception that the laminating step was omitted.

TABLE 1

| | Laminated [1] film | Non-laminated [1] film |
|---|---|---|
| Tensile strength (p.s.i.), MD [2] | 3,028 | 2,695 |
| (ASTM D-882-54TC) (p.s.i.), TD [3] | 2,327 | 2,133 |
| Tensile elongation (percent), MD [2] | 572 | 704 |
| (ASTM D-882-54TC), (percent), TD [3] | 1,216 | 1,048 |
| Gauge variation (percent) | 15 | 15 |

[1] Film gauge 2.0 mils; Laminated=1.0 mil film layers laminated together to equal 2.0 mils total wall thickness. Non-laminated=2.0 mils extruded wall thickness.
[2] Machine direction.
[3] Transverse direction.

As seen from the foregoing table, the laminar films, produced in accord with the method of the present invention, exhibit improved tensile properties as compared with non-laminar films of equivalent thickness.

Although the present invention has been described with preferred embodiments, resort to modifications and variations can be had without departing from the spirit and scope of the invention, as those skilled in the art will readily appreciate. Such variations and modifications are therefore considered to be within the purview and scope of the appended claims.

What is claimed is:

1. A method for the production of two-layer thermoplastic film laminates which comprises continuously extruding a single wall tubular film of molten thermoplastic resin, inflating said tube to at least twice its diameter to a predetermined thickness by maintaining a fluid, under a relatively low pressure interiorly of said tube, flattening said inflated tube into a sheet twice said predetermined thickness while the interior surfaces thereof are in a heat-softened semi-molten condition by passing said tube through the nip formed by a pair of rotating nip rollers, said nip rollers exerting a pressure of about at least 15 p.s.i. to flatten said tube, and simultaneously, during passage of said flattened tube through said rotating nip rollers heat-fusing the contacting interior wall surfaces of the heat-softened tube together and subsequently cooling said laminate to a permanent set condition.

2. A method in accordance with claim 1 wherein said thermoplastic film is polyethylene.

References Cited

UNITED STATES PATENTS

| 2,753,596 | 7/1956 | Bailey | 156—244 |
| 3,091,807 | 6/1963 | Turner et al. | 264—210 |
| 3,094,449 | 6/1963 | Sisson | 156—244 |
| 3,159,698 | 12/1964 | Suh et al. | 156—244 |
| 3,187,982 | 6/1965 | Underwood et al. | 156—244 |
| 3,277,221 | 10/1966 | Parrish | 156—244 |
| 3,291,876 | 12/1966 | Justus | 264—210 |
| 3,322,588 | 5/1967 | Schelhorn | 156—244 |
| 3,384,531 | 5/1968 | Parrish | 264—210 |

CARL D. QUARFORTH, Primary Examiner

H. E. BEHREND, Assistant Examiner

U.S. Cl. X.R.

156—244